US011758089B2

United States Patent
Cai et al.

(10) Patent No.: US 11,758,089 B2
(45) Date of Patent: Sep. 12, 2023

(54) VIDEO COMMUNICATIONS APPARATUS AND METHOD

(71) Applicant: VTech Telecommunications Limited, Hong Kong (CN)

(72) Inventors: Tomy Cai, Shenzhen (CN); Channing Chang, Shenzhen (CN)

(73) Assignee: VTECH TELECOMMUNICATIONS LIMITED, Hong Kong (CN)

( * ) Notice: Subject to any disclaimer, the term of this patent is extended or adjusted under 35 U.S.C. 154(b) by 0 days.

(21) Appl. No.: 17/402,306

(22) Filed: Aug. 13, 2021

(65) Prior Publication Data

US 2023/0048798 A1 Feb. 16, 2023

(51) Int. Cl.
H04N 7/15 (2006.01)
H04W 4/80 (2018.01)
(Continued)

(52) U.S. Cl.
CPC .............. H04N 7/15 (2013.01); G03B 21/53 (2013.01); G10L 21/0216 (2013.01); H04W 4/80 (2018.02); G10L 2021/02163 (2013.01)

(58) Field of Classification Search
CPC .. G03B 21/145; G03B 21/2066; G03B 21/53; G03B 21/62; G03B 17/55; G03B 21/16; G03B 21/204; G03B 17/54; G03B 21/18; G03B 21/30; G06F 1/1632; G06F 3/0425; G06F 3/1454; G06F 3/0304; G06T 19/006; G06T 7/60; G10L 21/0216; G10L 2021/02163; G10L 25/21; H04L 7/0041; H04L 43/10; H04L 7/15; H04N 5/2252; H04N 5/23216; H04N 7/144; H04N 7/15; H04N 7/155; H04N 9/3144; H04N 21/4788; H04N 9/3185; H04N 5/7475; H04N 9/3188; H04N 7/142; H04N 7/147; H04N 7/152; H04N 9/31; H04N 9/315;
(Continued)

(56) References Cited

U.S. PATENT DOCUMENTS 6,624,841 B1 * 9/2003 Buchner .................. H04N 7/15
348/E7.083
8,164,617 B2 * 4/2012 Mauchly .................. H04N 7/15
348/14.08
(Continued)

FOREIGN PATENT DOCUMENTS

| CN | 205071183 U | 3/2016 |
|---|---|---|
| EP | 3852361 A1 | 7/2021 |
| WO | 2004/023766 | 3/2004 |

OTHER PUBLICATIONS

Bhargava et al., "Joint Keystone Correction and Shake Removal for a Hand Held Projector", ISVC 2016, Part II, LNCS, 2016, pp. 269-278.
(Continued)

*Primary Examiner* — Gerald Gauthier
(74) *Attorney, Agent, or Firm* — STEPTOE & JOHNSON LLP; Benjamin Holt

(57) ABSTRACT

Provided are apparatuses and associated methods for video communications and related features. In one embodiment, a big-screen video communications apparatus is provided that includes a projector and speaker for projecting received images and sounds and includes a camera and microphone for capturing images and sounds for transmission.

38 Claims, 7 Drawing Sheets

(51) Int. Cl.
*G03B 21/53* (2006.01)
*G10L 21/0216* (2013.01)

(58) Field of Classification Search
CPC ...... H04N 9/317; H04N 9/3173; H04N 19/20;
H04W 4/80; H05K 7/2039; H05K 13/00;
F21V 7/00; F21V 29/70; G02B 27/48;
G11B 7/1275
USPC .......... 345/419, 690; 348/14.01, 14.08, 14.1,
348/143, 738, 789, 42, 333.1
See application file for complete search history.

(56) References Cited

U.S. PATENT DOCUMENTS

| Patent/Publication | Date | Inventor | Class |
|---|---|---|---|
| 8,208,002 B2* | 6/2012 | Saleh | H04N 7/15 348/14.08 |
| 8,462,192 B2* | 6/2013 | O'Connell | H04N 7/144 709/204 |
| 8,542,267 B1* | 9/2013 | Trott | G06F 3/0425 348/42 |
| 8,698,872 B2* | 4/2014 | Begeja | H04N 7/15 348/14.09 |
| 2004/0125348 A1* | 7/2004 | Carkner | G03B 21/30 353/119 |
| 2004/0239755 A1* | 12/2004 | Kjesbu | H04N 7/144 348/14.07 |
| 2005/0237868 A1* | 10/2005 | Nabe | G11B 7/1275 369/44.14 |
| 2006/0262284 A1* | 11/2006 | Onishi | G03B 21/145 348/E5.143 |
| 2006/0279706 A1* | 12/2006 | Bash | G03B 21/18 353/54 |
| 2007/0139887 A1* | 6/2007 | Lee | G03B 21/16 361/700 |
| 2010/0188478 A1* | 7/2010 | Robinson | H04N 7/15 348/E7.084 |
| 2011/0134205 A1* | 6/2011 | Arney | H04N 21/4788 348/E5.022 |
| 2012/0026279 A1* | 2/2012 | Kato | H04N 7/15 348/14.08 |
| 2012/0327377 A1* | 12/2012 | Ohsugi | H04N 9/317 353/38 |
| 2013/0010268 A1* | 1/2013 | Nishima | G03B 21/16 353/52 |
| 2013/0057684 A1* | 3/2013 | Iwai | H04N 7/15 348/143 |
| 2013/0063537 A1* | 3/2013 | Emori | H04N 7/15 348/14.01 |
| 2013/0242207 A1* | 9/2013 | Hiramatsu | H04N 5/7475 348/789 |
| 2013/0249959 A1* | 9/2013 | Umehara | H04N 9/3144 353/52 |
| 2014/0139717 A1* | 5/2014 | Short | H04N 9/3185 348/333.1 |
| 2014/0184725 A1 | 7/2014 | Wu et al. | |
| 2014/0240680 A1* | 8/2014 | Nishimori | F21V 7/00 362/235 |
| 2014/0267545 A1 | 9/2014 | Paripally et al. | |
| 2014/0340653 A1* | 11/2014 | Chifu | F21V 29/70 353/57 |
| 2015/0009218 A1* | 1/2015 | Fukutomi | H04N 9/3188 345/428 |
| 2015/0055024 A1* | 2/2015 | Christensen | G03B 21/62 353/15 |
| 2015/0181179 A1* | 6/2015 | Yamamoto | H04N 9/31 348/744 |
| 2015/0338725 A1* | 11/2015 | Kase | H04N 9/315 353/57 |
| 2016/0029001 A1* | 1/2016 | Jannard | G02B 27/48 353/7 |
| 2016/0073057 A1* | 3/2016 | Paripally | H04N 7/15 348/14.08 |
| 2016/0171780 A1* | 6/2016 | Vardi | G06F 3/0304 345/419 |
| 2016/0273753 A1* | 9/2016 | Inoue | G03B 21/16 |
| 2016/0344988 A1* | 11/2016 | Kase | H05K 13/00 |
| 2017/0026612 A1 | 1/2017 | Rintel et al. | |
| 2017/0150110 A1* | 5/2017 | Nevo | G06T 7/60 |
| 2017/0332517 A1* | 11/2017 | Gu | H04N 9/3173 |
| 2018/0012617 A1* | 1/2018 | Salishev | G10L 25/21 |
| 2018/0098029 A1* | 4/2018 | Cassini | H04N 5/23216 |
| 2018/0098036 A1* | 4/2018 | Cassini | H04N 5/2252 |
| 2018/0173084 A1* | 6/2018 | Kikuchi | G03B 21/204 |
| 2018/0352192 A1 | 12/2018 | Matsubara | |
| 2019/0171092 A1* | 6/2019 | Yamashita | G03B 21/145 |
| 2020/0099902 A1* | 3/2020 | Egawa | G03B 17/55 |
| 2020/0186575 A1* | 6/2020 | Rofe | H04L 43/10 |
| 2020/0387058 A1* | 12/2020 | Huang | H05K 7/2039 |
| 2021/0364900 A1* | 11/2021 | Hsien | G03B 21/2066 |
| 2022/0039550 A1* | 2/2022 | Shen | A47B 19/10 |
| 2023/0048798 A1* | 2/2023 | Cai | H04N 7/142 |

OTHER PUBLICATIONS

Kim et al., "Automatic Keystone Correction using a Single Camera", The 12th International Conference on Ubiquitous Robots and Ambient Intelligence (URAI 2015), Oct. 28-30, 2015, pp. 576-577.
International Search Report & Written Opinion from PCT/IB2022/00466, dated Dec. 6, 2022, 14 pages.

* cited by examiner

VIDEO COMMUNICATIONS APPARATUS AND METHOD

BACKGROUND OF THE INVENTION

Individuals and businesses often need to communicate with distant or remote locations. Such communications may include audio or video arrangements that require stationary communication systems, combinations of multiple audio or video devices, and small-screen displays.

DETAILED DESCRIPTION

Figure 1:
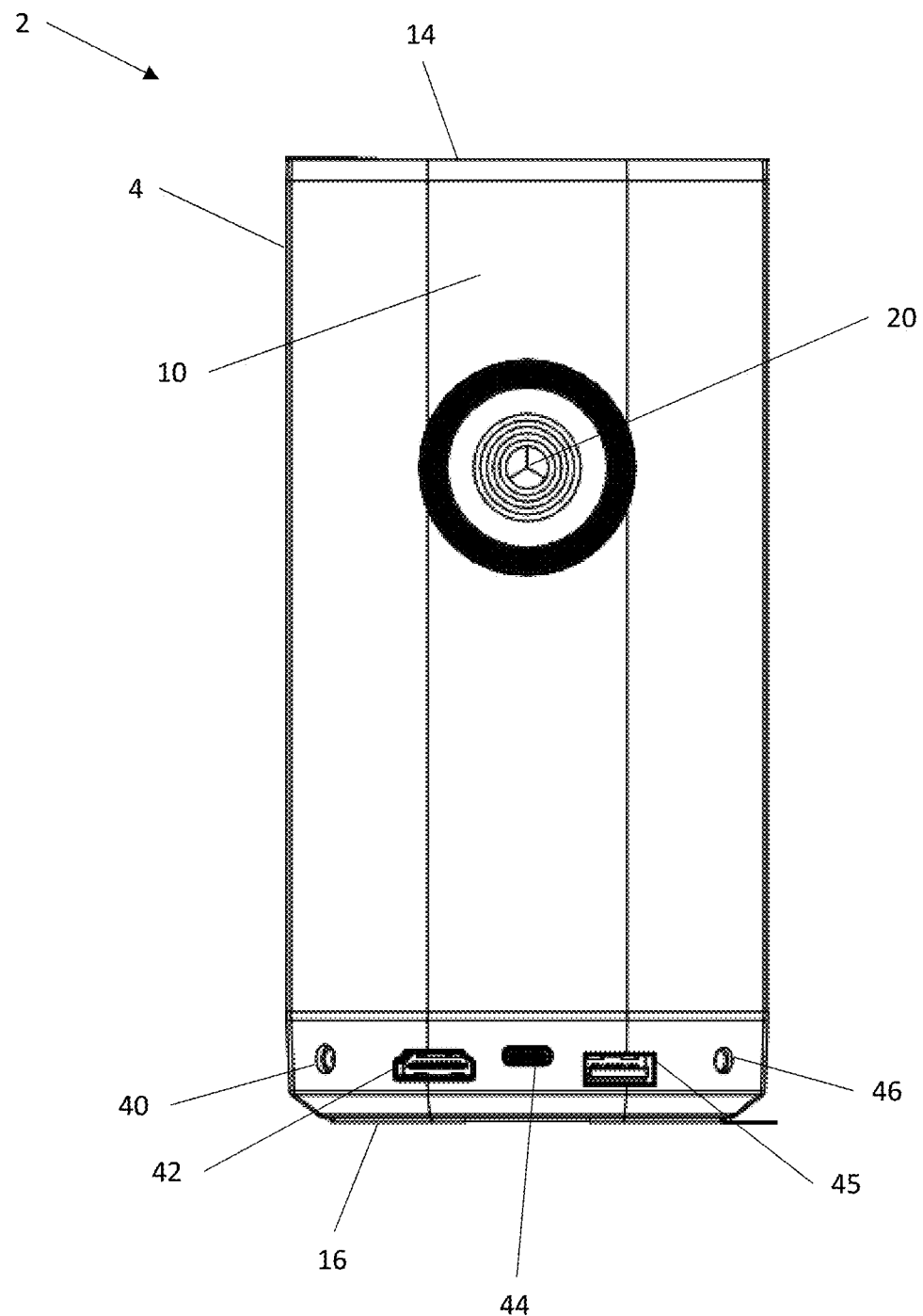
FIGS. 1-2 are front and back side views, respectively, of an exemplary video communications apparatus.

The following disclosure provides different embodiments, or examples, for implementing different features of the subject matter. Specific examples of components, features, arrangements, or steps are described below to simplify the present disclosure. These are, of course, merely examples and are not intended to be limiting.

In one embodiment, the invention can include an all-in-one apparatus for video communications, such as videoconferencing, and other related uses. The apparatus may include multiple components for receiving, producing, recording, and/or transmitting audio or images. For example, the apparatus may include one or more projectors, speakers, cameras, microphones, and other related components. The apparatus may include these multiple components in a single compact portable body. In one embodiment, the apparatus combines the components and operation of "big screen" technology, using a projector and speaker, with the components and operation of live broadcasting, using a camera and microphone.

In one embodiment, the apparatus includes a compact portable body. The apparatus body may house or contain, substantially or entirely, one or more components of the apparatus, including all components for receiving, producing, recording, and transmitting audio or images. The body may include one or more openings corresponding to such components. For example, the body may include an opening through which a speaker or microphone housed within the body may play or record, respectively, sound external to the body. Also, for example, the body may include one or more openings for lenses, such as an opening for a lens of a projector, camera, autofocus (AF) component, auto keystone correction component, or other related component.

In one embodiment, the apparatus includes one or more projectors. The projector may be an optical projector. In one example, the projector may be a Digital Light Processing (DLP) projector, LCD projector, LED projector, or Liquid Crystal on Silicon (LCoS) projector. For example, the projector may be a DLP projector that includes a Digital Micromirror Device (DMD) for digital optical processing for projecting an image.

In one embodiment, the projector may project one or more images onto one or more surfaces or objects, such as a projector screen, wall, ceiling, or building. (The word "image" herein encompasses both still images and videos.) In one example, the size of the projected image can be nearly any size. For example, the size of the projected image (measured diagonally) can be between 40 and 130 inches, although the minimum size may be smaller and the maximum size may be larger based upon the state of the art. In one example, the distance between the projector of the apparatus and the target surface upon which the image is projected can be nearly any distance. For example, this distance can be between 0.8 and 3.6 meters, although the minimum distance may be shorter and the maximum distance may be larger based upon the state of the art. In one example, the projection display size is dynamic. For example, the projection display size may be adjusted by manually or automatically adjusting the projector or adjusting the position of the apparatus relative to the target surface for the projection.

The projected image may be received, for example, from an internal storage or memory of the apparatus or from a source outside the apparatus via a wired or wireless connection. In one example, the projected image may be received from a personal device (e.g., phone, laptop, or tablet) connected to the apparatus via a close-proximity wireless connection (e.g., Bluetooth or screen casting or mirroring) or from a network connection (e.g., Internet or local area network (LAN)).

In one embodiment, the apparatus includes one or more components associated with the projector, such as an AF component and/or an auto keystone correction component. For example, the apparatus may include an AF component coupled to the projector such that the projector can be automatically focused to clearly project an image onto an associated surface. The AF component or system may include a sensor, for example, that analyzes a target surface for the projection, an actuator, for example, to change the focus of the projector, and a control component. In one example, the apparatus may include an auto keystone correction component coupled to the projector such that the projector can be automatically keystone-corrected to project an image onto an associated surface as a rectangle, even if the projector is aligned non-perpendicular to the surface. The auto keystone correction component or system may include a sensor (for example, that may analyze a target surface for the projection or an alignment of the projector), an actuator (for example, that may adjust the projector's keystone settings or intentionally distort or skew the output image for projection), and/or a control component. In one example, a single component may include both AF capabilities and auto keystone correction capacities and thus constitute both an AF component and an auto keystone correction component.

In one embodiment, the projector and/or related components (e.g., AF component and/or auto keystone correction component) may be housed substantially or entirely within the compact portable body of the apparatus. The body may include an opening for the projector lens and/or one or more lenses for an AF component and/or auto keystone correction component. In one example, the projector lens and/or other lenses are flush with an external surface of the body.

In one embodiment, the apparatus includes one or more speakers. For example, the speaker may produce or transmit audio, such as music, a voice recording, or other sound. In one example, a speaker in the apparatus may produce audio associated with a corresponding image projected by a projector of the apparatus. The produced audio may be received, for example, from an internal storage or memory of the apparatus or from a source outside the apparatus via a wired or wireless connection. In one example, the produced audio may be received from a personal device (e.g., phone, laptop, or tablet) connected to the apparatus via a close-proximity wireless connection (e.g. Bluetooth or screen casting or mirroring) or from a network connection (e.g., Internet or LAN).

In one embodiment, the speaker may be housed substantially or entirely within the compact portable body of the apparatus. The body may include one or more openings for the speaker.

In one embodiment, the apparatus includes one or more cameras. (The word "camera" also herein encompasses a video camera.) The camera may be a digital video camera. In one embodiment, the camera may include one or more features including pan and tilt capabilities, zoom and adjustable field of view (FOV) capabilities, a wide-angle lens, variable focal lengths, adjustable camera direction, subject tracking, and other camera features.

In one embodiment, the camera may capture or record an image. In one embodiment, the recorded image is transmitted by the apparatus via a wired or wireless connection. For example, the recorded image may be transmitted through a personal device (e.g., phone, laptop, or tablet) connected to the apparatus via a close-proximity wireless connection (e.g., Bluetooth) or through a network connection (e.g., Internet or LAN).

In one embodiment, the apparatus includes one or more components associated with the camera, such as a lighting component. For example, the apparatus may include a lighting component coupled to the camera such that improved lighting is automatically or manually applied to the subject of the image recorded by the camera.

In one embodiment, the camera and/or related components may be housed substantially or entirely within the compact portable body of the apparatus. The body may include an opening for the camera lens and/or related components. In one example, the camera lens is flush with an external surface of the body.

In one embodiment, the apparatus includes one or more microphones. For example, the microphone may record or capture audio, such as music, a voice recording, or other sound. In one example, a camera of the apparatus may record the image of a subject, and a corresponding microphone in the apparatus may record audio associated with the subject. The recorded audio may be transmitted, for example, by the apparatus via a wired or wireless connection. For example, the recorded audio may be transmitted through a personal device (e.g., phone, laptop, or tablet) connected to the apparatus via a close-proximity wireless connection (e.g., Bluetooth) or through a network connection (e.g., Internet or LAN).

In one embodiment, the apparatus may include more than one microphone, for example from two to five (or more) microphones. In one embodiment, the microphone may include a noise reduction feature and/or an echo cancellation feature. For example, when recording a first sound with a microphone or processing the first sound, a noise cancellation feature associated with the microphone or a corresponding CPU may cancel or reduce a second sound from the first sound. For example, such a second sound that is canceled from the first sound recorded by a microphone of the apparatus may be a sound played by a speaker that is in, connected to, or proximate to the apparatus.

In one embodiment, the microphone may be housed substantially or entirely within the compact portable body of the apparatus. The body may include one or more openings for the microphone.

In one embodiment, all of the various audio and visual recording and producing components of the apparatus, or any combination thereof, may be accessed or utilized simultaneously. In one embodiment, the simultaneous access or use of all or a combination of the various audio and visual recording and producing components may be for a single purpose or for two or more independent purposes.

In one example, a projector, speaker, camera, and microphone may all be accessed or used simultaneously for a single purpose such as a videoconferencing (or video meeting) session, for example, by (i) accessing or using the camera and microphone to record an image and audio, respectively, of one or more users who are proximate to the apparatus to send to one or more remote persons and (ii) accessing or using the projector and speaker to produce an image and audio, respectively, of the one or more remote persons for the user(s) proximate to the apparatus to see and hear.

In one example, each of the various audio and visual recording and producing components may be accessed or used independently or in combination, such as for a phone call or for voice control of the apparatus or other smart device (microphone), for a video call, video recording, or video broadcasting (camera and microphone), for playing music (speaker), for displaying a presentation (projector), and/or for watching videos, playing video games, or mobile casting or mirroring (projector and speaker). In one example, two or more independent uses may operate simultaneously. For example, a projector, speaker, camera, and microphone of a single apparatus may all be accessed or used simultaneously for the separate purposes of displaying a presentation (projector), playing music (speaker), and recording a video (camera and microphone).

In one embodiment, the apparatus may include a camera positioned on a first side of the compact portable body and a projector positioned on the opposite side of the body. For example, the apparatus may be positioned between one or more users in view of the apparatus and a target surface such that (i) the camera on the first side of the body is directed toward and can record images of the user(s) and (ii) the projector on the second opposite side of the body is directed toward and can project images onto the target surface. In one embodiment, the projector is positioned on a top side of the compact portable body.

In one embodiment, the apparatus may include a camera with a dynamic positioning relative to the apparatus body. For example, the position of the camera may be manually or automatically adjusted to a different side of the apparatus or a different height along a side of the apparatus. In one embodiment, the apparatus may include a camera with a dynamic camera direction. For example, the camera direction may be manually or automatically adjusted by panning or tilting. The camera may also include manual or automatic zooming capabilities. The camera's pan, tilt, and zoom may be performed electronically or physically. The camera may also include a manually or automatically adjustable FOV.

In one embodiment, the apparatus may include a projector with a dynamic positioning relative to the apparatus body. For example, the position of the projector may be manually or automatically adjusted to a different side of the apparatus or a different height along a side of the apparatus. In one embodiment, the apparatus may include a projector with a dynamic projector direction. For example, the projector direction may be manually or automatically adjusted by panning or tilting. The projector may also include manual or automatic zooming capabilities. The projector's pan, tilt, and zoom may be performed electronically or physically.

In one embodiment, the apparatus may include a plurality of cameras, and the apparatus may be positioned such that the cameras are directed toward and can record images of a plurality of users within view of the apparatus. In one embodiment, the apparatus may include a plurality of cameras, and the position or direction of one or more of the cameras may be manually or automatically adjusted such that the cameras are directed toward and can record images of a plurality of users positioned within view of the apparatus.

In one embodiment, the apparatus may have a compact portable design. For example, the apparatus may include all necessary components in a single device that a user may use to participate in a videoconference with a second remote person and can easily transport and store. In one example, the compact portable body is not stationary or secured (e.g., permanently or detachably) to a surface, structure, object, or placement. In one example, the compact portable body of the apparatus may be substantially shaped like a cylinder, rectangular prism, or cube. In one example, the height of the compact portable body may be between 5 and 30 cm, but may be larger or smaller based upon the state of the art. For example, the height of the compact portable body may be less than 30, 25, 20, 18, 16, 15, 14, 13, 12, 11, 10, 9, 8, 7, 6, or 5 cm. In one example, the largest width of the compact portable body may be between 5 and 30 cm, but may be greater or lesser based upon the state of the art. For example, the largest width of the compact portable body may be less than 30, 25, 20, 18, 16, 15, 14, 13, 12, 11, 10, 9, 8, 7, 6, or 5 cm. In one example, the apparatus weighs between 0.5 and 10 pounds, but may weigh more or less based upon the state of the art. For example, the apparatus may weigh less than 10, 8, 6, 5, 4.5, 4, 3.5, 3, 2.5, 2, 1.5, 1, 0.75, or 0.5 pounds.

In one embodiment, the apparatus does not require any separate support structure or device for operation. For example, the apparatus body may include a base capable of supporting, balancing, and stabilizing the apparatus when the base is set on a surface or object, such as a table, desk, or floor.

In one embodiment, the apparatus does not require any cables or wires for operation. For example, the apparatus may use wireless connections for receiving images and audio to produce with the projector and speaker, respectively, and/or wireless connections for transmitting images and audio recorded with the camera and microphone, respectively. Also, for example, the apparatus may include a battery sufficient to power the apparatus during operation. For example, the battery may be a lithium ion battery or other similar battery. The battery may be replaceable or rechargeable.

In one embodiment, the apparatus does not require any separate device to control operation of the apparatus. For example, the apparatus may include one or more switches (e.g., buttons, knobs, LCD display screen, or other controls) to control operation of the apparatus. In one example, such switches include a power switch, one or more switches related to modes of operation or connections, one or more volume switches (e.g., volume up, volume down, and mute), one or more navigational switches (e.g. up, down, left, right), a selection switch, and a return switch. In one embodiment, such switches are located on one or more external surfaces or sides of the compact portable body of the apparatus. In one embodiment, a separate device may be used to control operation of the apparatus, such as a remote control or personal device (e.g., phone, laptop, or tablet). For example, to allow such a separate device to control operation of the apparatus, the separate device may be connected to the apparatus, such as via Bluetooth, Wi-Fi, or USB receiver.

In one embodiment, the apparatus is not associated with a specific or dedicated projector screen. For example, the compact portable apparatus may be easily transported to and set up in different locations to project images onto any suitable surface or object, such as a projector screen, wall, ceiling, or building.

In one embodiment, the apparatus may have one or more hardwired connection ports. For example, the apparatus may include a connection port for a wired power supply, such as a DC-in port, and/or an internal battery. For example, the apparatus may include one or more hardwired connection ports for receiving and/or transmitting audio or image data, such as an HDMI port, USB port (e.g., Type A, B, or C; mini or micro), AUX port or headphone jack, Ethernet port, DisplayPort, VGA port, or Apple® brand port (e.g., Thunderbolt or Lightning ports). In one example, audio for the speaker or from the microphone may be received or transmitted, respectively, through an AUX port, for example, to an audio device. In one example, the apparatus may include an HDMI port to receive images and/or audio to be produced by the projector and speaker, respectively. In one example, the apparatus may include a USB port to receive images and/or audio to be produced by the projector and speaker, respectively, or to transmit images and/or audio recorded by the camera and microphone, respectively.

In one embodiment, the apparatus may have one or more wireless connection components. For example, the apparatus may include one or more wireless connection components for receiving and/or transmitting audio or image data through a Personal Area Network (PAN), Local Area Network (LAN), and/or Wide Area Network (WAN). For example, the apparatus may include a Bluetooth connection component, Wi-Fi connection component, and/or a cellular connection component (e.g. LTE, GSM, or CDMA). In one example, the apparatus may be paired via a Bluetooth connection to, for example, a personal device (e.g., phone, laptop, or tablet), with which the apparatus may receive images and/or audio to be produced by the projector and speaker, respectively, or transmit images and/or audio recorded by the camera and microphone, respectively. In one example, the apparatus may be paired via a Bluetooth connection to, for example, an audio device, from which the apparatus may receive audio to be played by the speaker. In one example, the apparatus may be connected via a Wi-Fi connection or cellular data connection to the Internet, through which the apparatus may receive images and/or audio to be produced by the projector and speaker, respectively, or transmit images and/or audio recorded by the camera and microphone, respectively.

In one embodiment, a user may use screen mirroring or screen casting to connect to the apparatus, for example, with a personal device (e.g., phone, laptop, or tablet). For example, the apparatus may receive, through screen mirroring or screen casting, images and/or audio to be produced by the projector and speaker.

In one embodiment, two or more of the apparatuses may be paired and synced. For example, two apparatuses that are paired and synced may be used to establish a single videoconferencing session accessing or using the projectors, speakers, cameras, and/or microphones from both apparatuses. In one example, when two apparatuses that are paired and synced for a single videoconferencing session, images received for projection may be shown in duplicate by the projector(s) of each apparatus or may be divided between the projector(s) of each apparatus, for example, like dual monitors.

In one embodiment, the apparatus includes at least one CPU, microprocessor, microcontroller, or other computing component. For example, the CPU or other computing component may be coupled to, or configured to control, any other component of the apparatus, including components for receiving, producing, recording, and transmitting audio or images and components for establishing wired and wireless connections. In one embodiment, the apparatus includes at least one internal storage or memory, such as Read-Only Memory (ROM), random-access memory (RAM), hard-drive, volatile memory, or non-volatile memory, coupled to, and controlled by, the CPU.

In one embodiment, the apparatus may include a built-in software application, such as a built-in videoconferencing application. The built-in application, for example, may be stored in an internal storage and run on a CPU or other computing component. In one example, running the built-in videoconferencing application may access or utilize a projector, speaker, camera, and microphone of the apparatus to establish a videoconferencing session or video meeting. The videoconferencing session may include, for example, accessing or using the camera and microphone to record images and audio, respectively, of one or more users within the camera's view and the microphone's range, and transmitting the recorded images and audio via a wired or wireless connection to one or more remote attendees. The videoconferencing session may also include, for example, receiving images and audio from the one or more remote attendees via a wired or wireless connection, projecting the received images onto a suitable surface by accessing or using the projector, and playing the received audio by accessing or using the speaker.

In one embodiment, the apparatus may include a heat dissipation system. For example, the heat dissipation system may cool and/or expel hot gas from components housed within the compact portable body. Such hot gas may result from, for example, the projector. Heat may impair operation of, for example, the camera, battery, and CPU. In one example, the heat dissipation system may include a fan (e.g., pulse width modulation (PWM) fan) and a heat sink (e.g., including a low-temperature fluid medium, such as cooled air or cooled water in pipes). For example, the heat sink may transfer heat away from the heat source and/or heat-sensitive components, and the fan may draw air through an air inlet and expel air out from an air outlet associated with the heat sink.

The invention also includes a method for video communications, such as videoconferencing. In one embodiment, the method may include providing a video communications apparatus such as described herein. The method may further include positioning the apparatus. In one example, positioning the apparatus may include setting the apparatus's base on a surface or object, directing one or more projectors of the apparatus at one or more target surfaces or positioning one or more target surfaces relative to one or more projectors of the apparatus, and directing one or more cameras of the apparatus at one or more users in view of the apparatus or positioning one or more users relative to one or more cameras of the apparatus.

In one embodiment, the method may include recording an image of one or more users in view of the apparatus, using one or more cameras of the apparatus, and may include recording audio from one or more users, using one or more microphones of the apparatus. In one embodiment, the method may further include transmitting the recorded image and recorded audio via a wired or wireless connection, as described herein, to one or more remote participants.

In one embodiment, the method may include receiving an image and audio via a wired or wireless connection, as described herein, from one or more remote participants. In one embodiment, the method may further include projecting the received image, using one or more projectors of the apparatus, and playing the received audio, using one or more speakers of the apparatus. In one example, projecting the received image may include focusing one or more projectors onto one or more target surfaces. For example, an AF component may automatically focus a projector to project the received image clearly onto a target surface and an auto keystone correction component may automatically focus a projector to project the received image onto a target surface as a rectangle.

In one embodiment, the method may include running an application on a CPU or other computing component of the apparatus, such as a built-in videoconferencing application.

Figure 2:
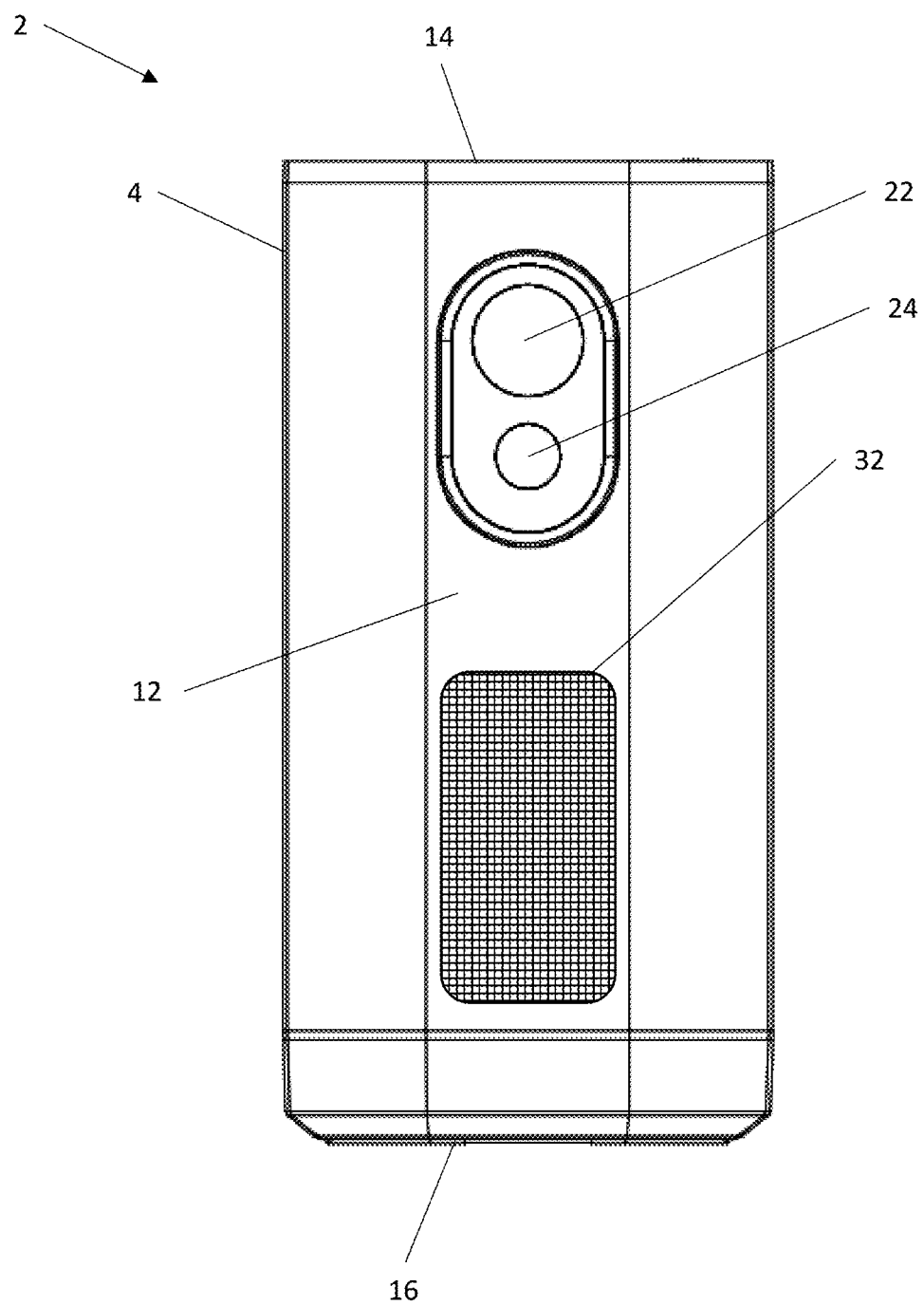
Figure 3:
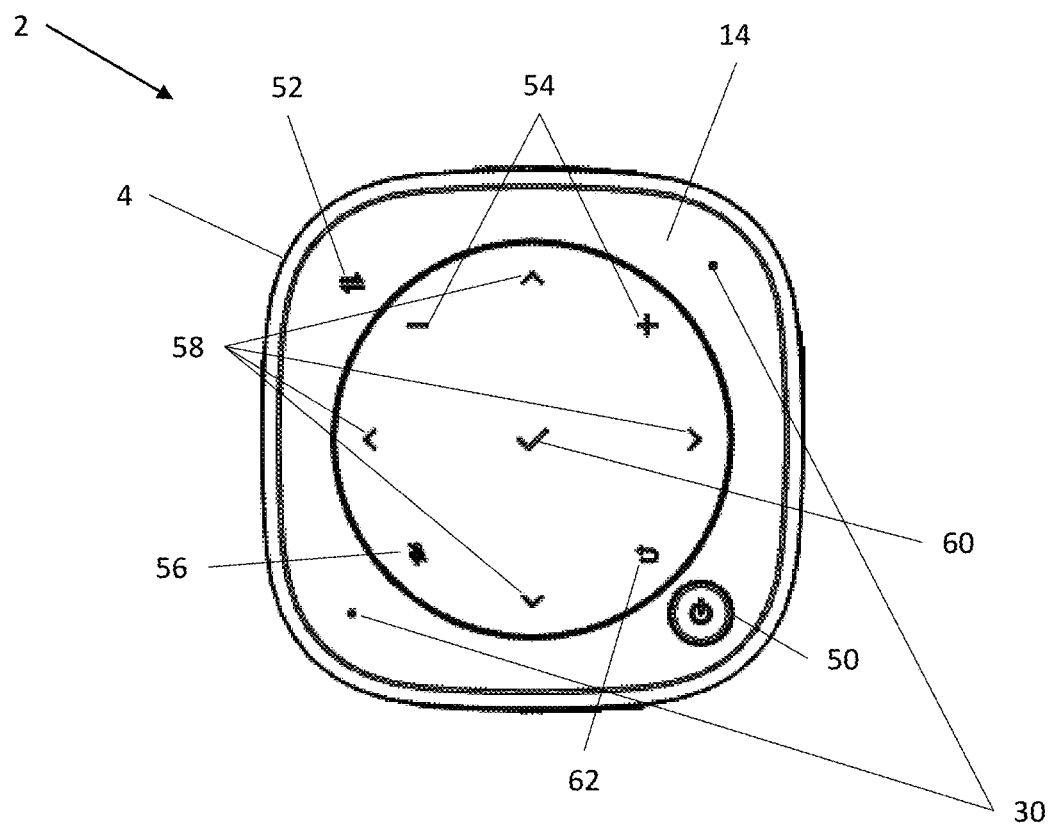
FIG. 3 is a top view of an exemplary video communications apparatus.

FIG. 1 and FIG. 2 show a front side view and back side view, respectively, of an exemplary video communications apparatus 2. FIG. 3 shows a top view of the exemplary video communications apparatus 2. The apparatus 2 includes a portable body 4 that is substantially cylindrical. The portable body 4 is compact and houses all of the components of the apparatus 2, discussed below. The portable body 4 is easily transported and stored. The portable body 4 includes a first side 10 shown in FIG. 1, as well as a top side 14 and a base 16. In one example, the height of the portable body 4 from the top side 14 to the base 16 may be about 18 cm or less. In one example, the largest width of the portable body 4 may be about 9 cm or less. The apparatus 2 may be set on its base 16, which supports, balances, and stabilizes the apparatus 2.

The apparatus 2 includes a camera 20, which may be a wide-angle, Full High Definition (FHD) camera. The camera 20, and specifically the lens of the camera 20, is positioned on the first side 10 of the portable body 4 and is directed outward from the first side 10. The lens of the camera 20 may be substantially flush with the external surface of the first side 10 of the portable body 4. The camera 20 can capture or record images of subjects within view of the camera 20 on the first side 10.

The apparatus 2 includes multiple hardwired ports, including an AUX port 40, an HDMI port 42, a USB-C port 44, a USB-A port 45, and a DC-in port 46, which are located proximate to the bottom or base 16 of the portable body 4. The AUX port 40 may connect an external audio device to the apparatus 2, such as headphones or an audio source, for example, a personal device (e.g., phone, laptop, or tablet), such that the apparatus 2 can receive audio to be played by a speaker 32 (see FIG. 2), transmit audio to be played by the external audio device, or receive audio recorded by the external audio device in lieu of microphones 30 (see FIG. 3). The HDMI port 42 may connect to an external device, such as a personal device (e.g., phone, laptop, or tablet), such that the apparatus 2 can receive images to be projected by the projector 22 (see FIG. 2) and can receive audio to be played by the speaker 32 (see FIG. 2). The USB-C port 44 or USB-A port 45 may connect to an external device, such as a USB drive or a personal device (e.g., phone, laptop, or tablet), such that the apparatus 2 can receive images to be projected by the projector 22 (see FIG. 2), can receive audio to be played by the speaker 32 (see FIG. 2), can transmit images recorded by the camera 20, and can transmit audio recorded by the microphones 30 (see FIG. 3). The apparatus 2 also includes multiple wireless connection components (not shown) with capabilities to connect the apparatus 2 to networks (e.g., Wi-Fi, Bluetooth, and the Internet) and devices (e.g., phones, laptops, tablets, and audio devices) through which, or to which, the apparatus 2 can transmit images and audio, such as images recorded by the camera 20 and audio recorded by the microphones 30 (see FIG. 3), and through which, or from which, the apparatus 2 can receive images and audio, such as images to be projected by the projector 22 (see FIG. 2), and audio to be played by the speaker 32 (see FIG. 2).

As shown in FIG. 2, the portable body 4 of the apparatus 2 includes a second side 12, which is opposite first side 10 shown in FIG. 1.

The apparatus 2 includes a projector 22 and an associated AF 24. The projector 22 may be an optical DLP projector. The projector 22 and AF 24, and specifically the lenses of the projector 22 and AF 24, are positioned on the second side 12 of the portable body 4 and are directed outward from the second side 12. The lenses of the projector 22 and AF 24 may be substantially flush with the external surface of the second side 12 of the portable body 4. The projector 22 may project images onto a target surface (not shown) within view and range of the projector 22 on the second side 12. The AF 24 may also include auto keystone correction capabilities.

Figure 7:
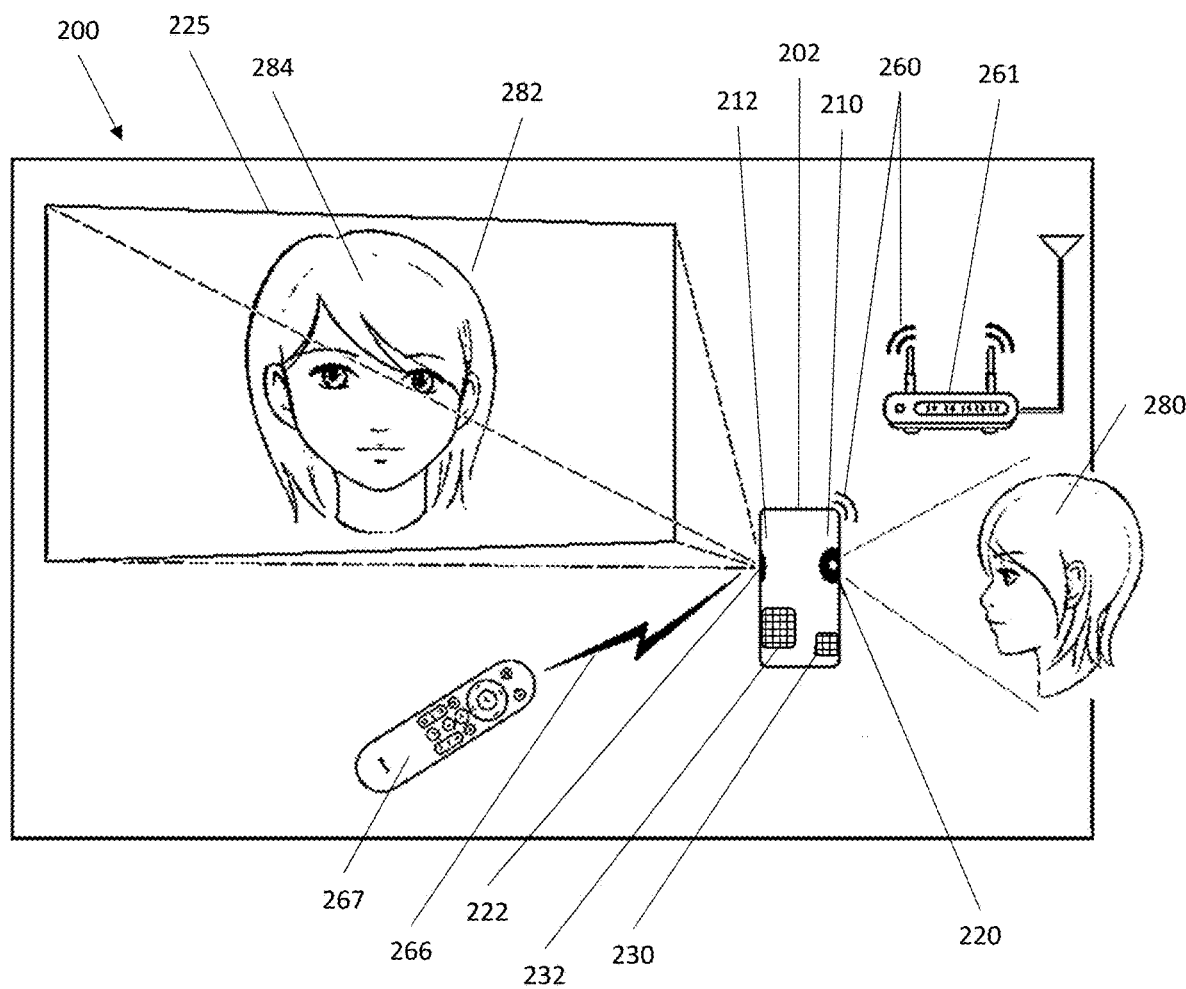
FIG. 7 is a system diagram of an exemplary video communications apparatus in use.

As shown by FIGS. 1 and 2, the camera 20 and the projector 22 of the apparatus 2, and specifically the lenses thereof, are positioned on opposite first and second sides 10, 12 of the portable body 4, respectively, and are directed in opposite directions outward from the first and second sides 10, 12, respectively. In one example, the apparatus 2 may be positioned between one or more subjects such as users (not shown) and a target surface (not shown) such that (i) the users are within view of the camera 20, which can capture or record images of the users, and (ii) the target surface is within view and range of the projector 22, which can project images onto the target surface. (See, for example, FIG. 7 showing the positioning of apparatus 202, which is comparable to apparatus 2 depicted in FIGS. 1-3.)

The AF 24 of the apparatus 2 includes a sensor (not shown) and performs an analysis of a target surface (not shown) at which the projector 22 is directed. (See, for example, FIG. 7 showing apparatus 202 directed at screen 225, where apparatus 202 is comparable to apparatus 2 depicted in FIGS. 1-3.) For example, AF 24 may analyze a target surface by detecting the distance, direction, and/or angle of the target surface, and the apparatus 2 may use such information gathered by the AF 24 to automatically focus the projector 22 and correct the keystone effect of the projector 22 such that an image projected by the projector 22 onto the target surface is clear, focused, and rectangular.

The apparatus 2 includes a speaker 32. The speaker 32 may play audio, such as music, voice recordings, or other sounds. The speaker 32 may play audio that corresponds to an image projected by the projector 22 or audio that is separate and independent of any image projected by the projector 22.

As shown in FIG. 3, the portable body 4 of the apparatus 2 includes a top side 14. The apparatus 2 includes two microphones 30, which are located on the top side 14. The microphones 30 may record audio, such as voices or other sounds, and use noise reduction and echo cancellation, for example, to cancel audio played from the speaker 32 from the audio recorded by the microphones 30. For example, the microphones 30 may record audio from one or more users speaking within range of the microphones 30 of the apparatus 2. In one example, the microphones 30 may record audio from one or more users whose image is being recorded by the camera 20.

Multiple switches (or buttons) may be located on the top side 14, including a power switch 50, mode switch 52, volume control switches 54, mute switch 56, navigation switches 58, selection switch 60, and return switch 62. The power switch 50 may turn on or off the apparatus 2, or place the apparatus 2 into a sleep mode. The mode switch 52 may be used to switch between different modes of operation of the apparatus 2. For example, mode switch 52 may be used to select a mode of operation in which the camera 20, projector 22, microphones 30, and speaker 32 are all operative, a mode where only one of those components is operative (e.g., projector 22 only), or a mode where any combination of those components is operative (e.g., projector 22 and speaker 32 only). The volume control switches 54 may turn the volume of the speaker 32 up or down. The mute switch 56 may mute the microphones 30 and/or the speaker 32. The navigation switches 58 and selection switch 60 may be used, for example, to navigate (e.g., up, down, left, and right) and make selections from, respectively, a menu of options. For example, such a menu may be on a device (not shown) connected to or paired with the apparatus 2, such as a personal device (e.g., phone, laptop, or tablet) connected to the apparatus 2 via Bluetooth or Wi-Fi. For example, such a menu may be part of a built-in software application (e.g., videoconferencing application) stored in and run by the apparatus 2. The return switch 62 may be used for such menus, to "return" or "go back," or to quit some operation or mode, such as to quit screen mirroring or casting or quit projecting content received from a particular source (e.g., an HDMI connection).

Figure 4:
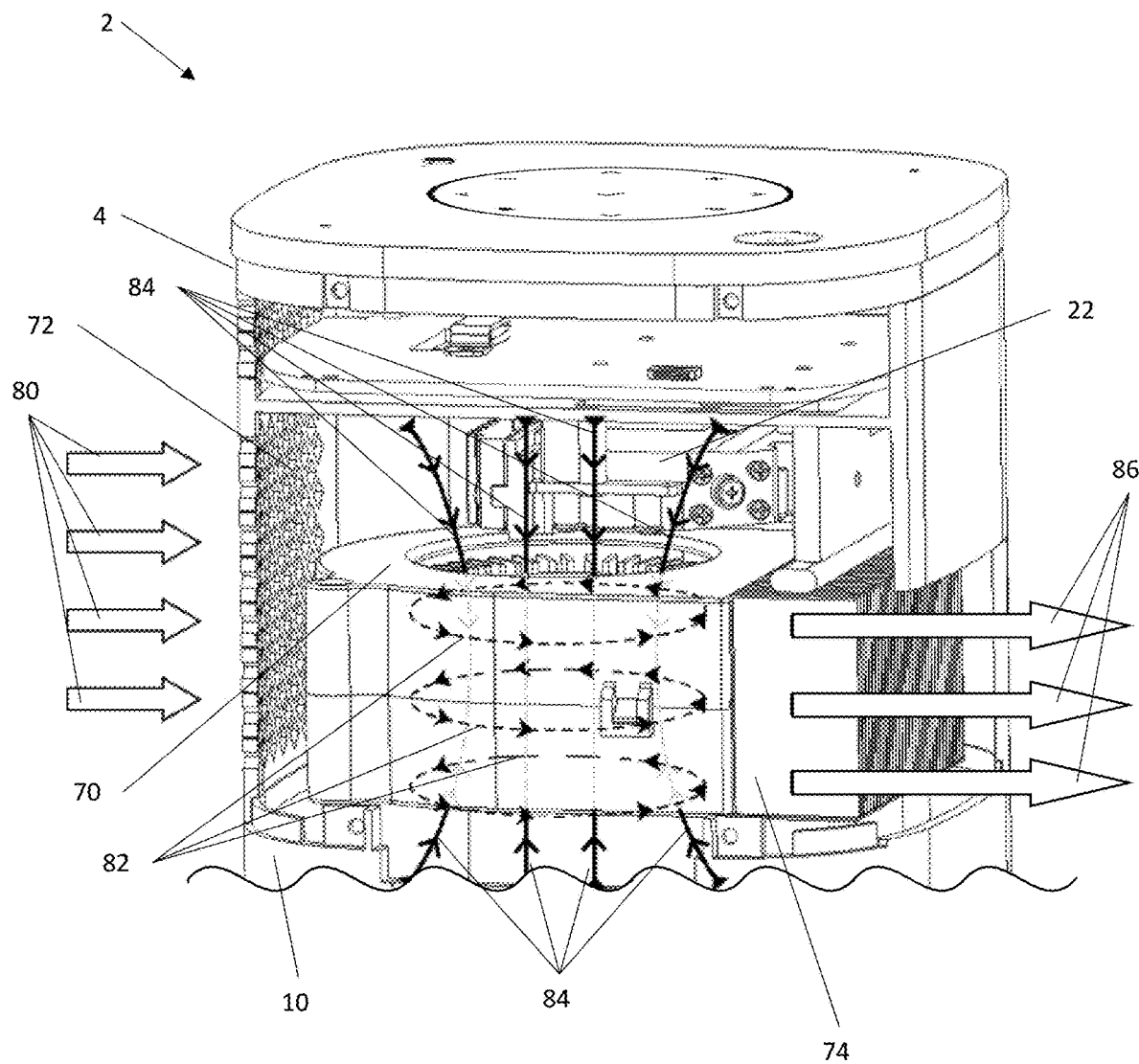
FIG. 4 is a partial perspective view of an exemplary video communications apparatus with a side portion of its external body removed to show internal components of the apparatus.
Figure 5:
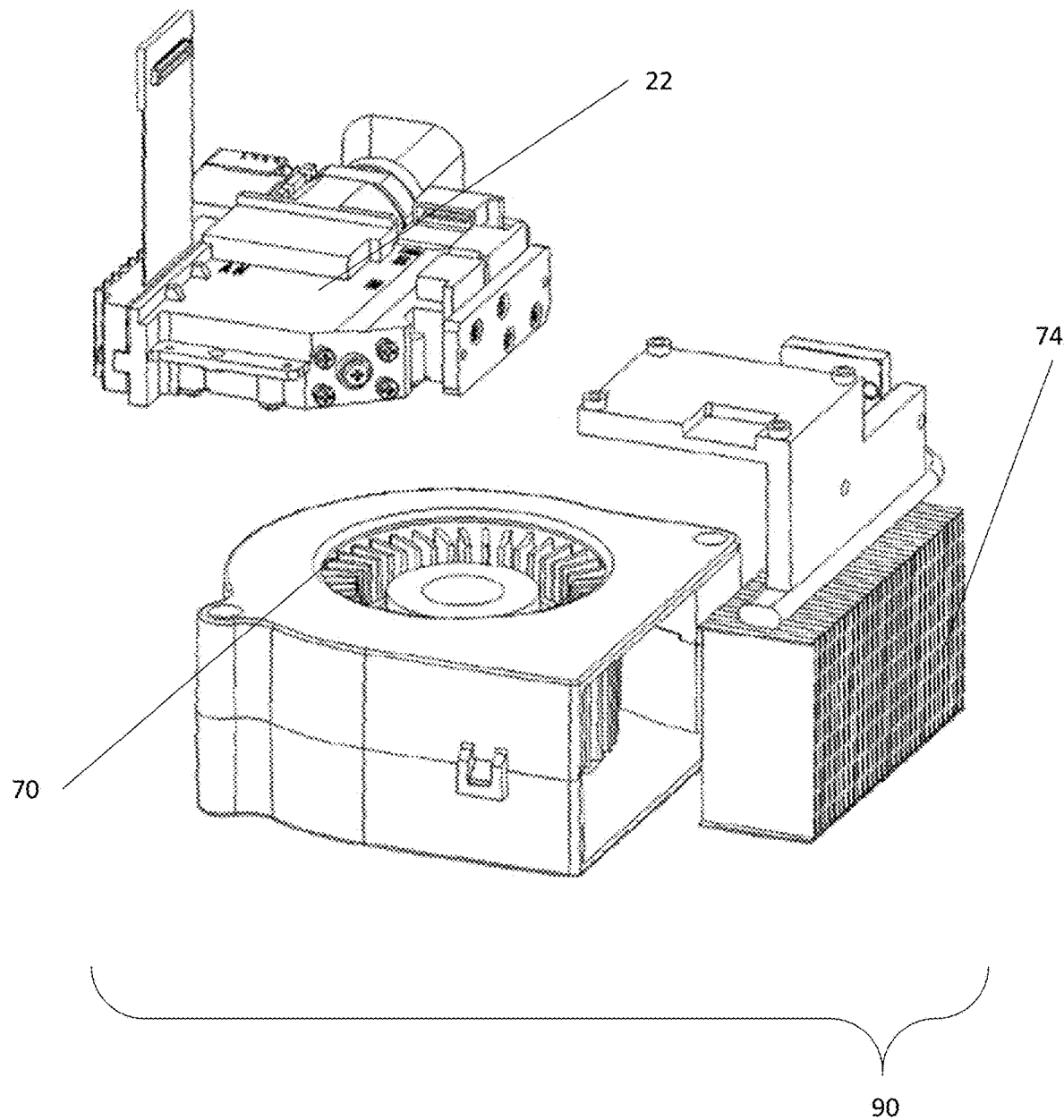
FIG. 5 is an exploded view of certain internal components of an exemplary video communications apparatus.

FIG. 4 is a partial perspective view of the exemplary video communications apparatus 2 with a portion of the first side 10 of the portable body 4 removed to show internal components of the apparatus 2, including a fan 70 and heat sink 74 of a heat dissipation system that removes hot gas, for example, from the projector 22. FIG. 5 is an exploded view of these three named internal components of the exemplary video communications apparatus 2—i.e., projector 22, fan 70, and heat sink 74—embraced by bracket 90 to indicate their relationship.

In one example, the fan 70 can be a PWM fan. The apparatus 2 may sense a temperature, such as a temperature inside the portable body 4 and/or proximate to an internal component such as the projector 22 or the camera 20, and the apparatus 2 may adjust the speed of the fan 70 accordingly, such as by increasing the speed of the fan 70 to cool the inside of the portable body 4 or an internal component therein.

The heat dissipation system of apparatus 2 can use the fan 70 to draw air into the portable body 4 of the apparatus 2 via an air inlet 72, creating a first air flow 80. The heat dissipation system can also use the fan 70 to create a second air flow 82 within the portable body 4 of the apparatus 2, which can be air circulation, for example, in a circular motion within the fan 70. The heat dissipation system can also use the fan 70 to create a first hot gas flow 84, which can be the drawing of hot air from internal components of the apparatus 2, such as from the projector 22, into the fan 70 and/or the second air flow 82. The heat dissipation system can also use the fan 70 to expel hot air out of the portable body 4 of the apparatus 2 through the heat sink 74, creating a second hot gas flow 86.

In one example, the heat sink 74 can include water-cooled copper pipes, for example, to conduct heat away from internal components within the portable body 4, including internal components that generate heat, such as the projector 22. The heat sink 74 can conduct such heat away from internal components and to the portion of the heat sink 74 through which the fan 70 expels hot gas via the second hot gas flow 86.

Figure 6:
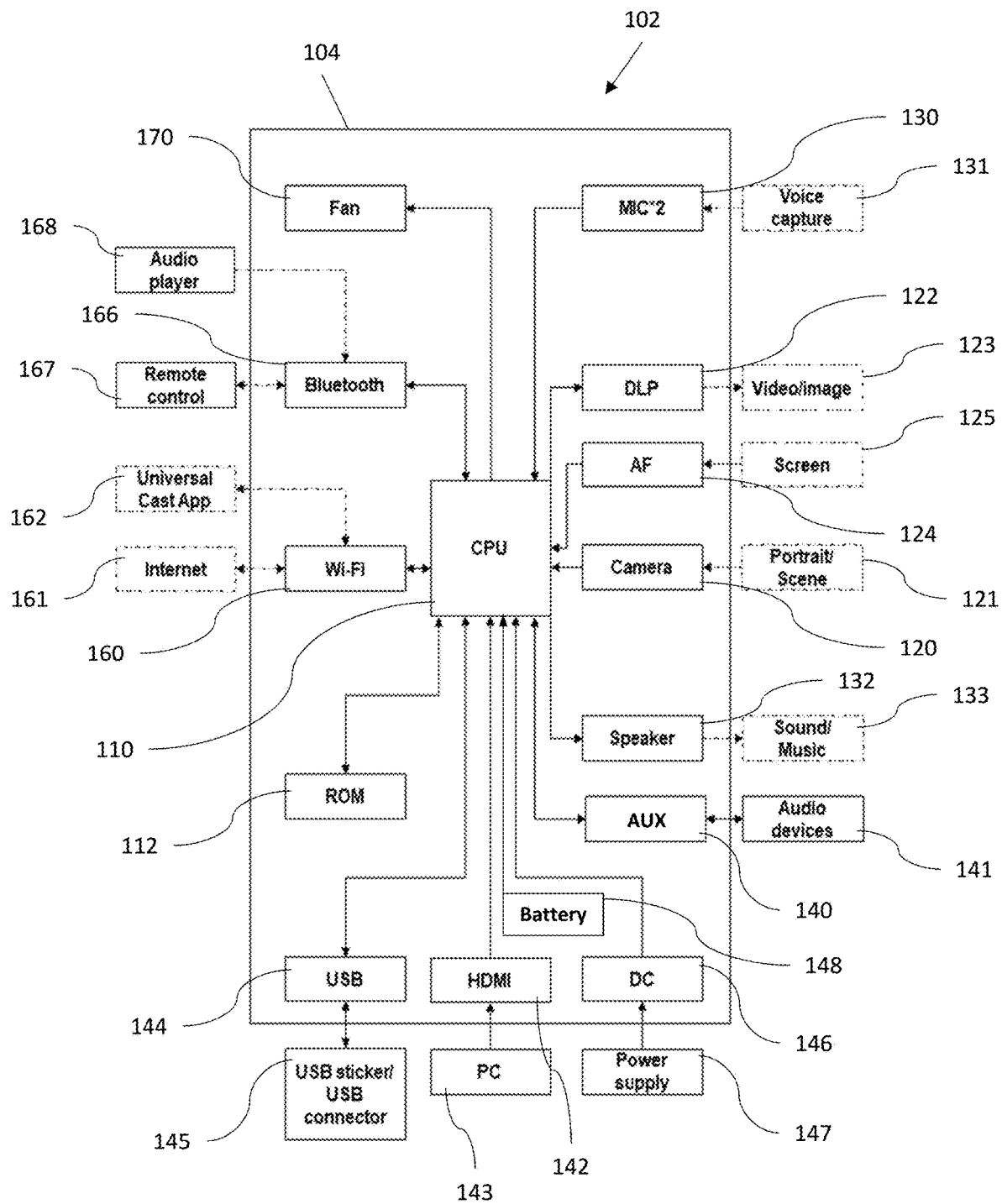
FIG. 6 is a schematic block diagram of an exemplary video communications apparatus.

FIG. 6 is a schematic block diagram of an exemplary video communications apparatus 102. The apparatus 102 includes internal components: CPU 110, ROM 112, camera 120, DLP projector 122, AF 124, two microphones 130, speaker 132, AUX input 140, HDMI input 142, USB input 144, DC input 146, battery 148, Wi-Fi component 160, Bluetooth component 166, and fan 170. All of these internal components are housed within a portable body 104 of the apparatus 102. And all of these internal components other than CPU 110 are coupled to CPU 110, which may control and direct the operation of the internal components.

The apparatus includes a read-only memory (ROM) 112 coupled to the CPU 110. The ROM 112 may store information for the apparatus 102, such as information regarding the operation, connections, and settings of the apparatus 102 or any components thereof. For example, the ROM 112 may store information regarding a videoconferencing application, which may be run on the CPU 110. The videoconferencing application, for example, may access or use components of the apparatus 102 to (i) record and transmit images and audio of one or more users of the apparatus 102 to one or more remote videoconference participants and (ii) receive images and audio from the one or more remote videoconference participants to project and play, respectively.

The camera 120 may capture or record a portrait or scene 121, such as an image of a user. The microphones 130 may record voice capture 131, such as voice capture of a user. The DLP projector 122 may project a video or image 123, such as an image of a remote videoconference participant. The AF 124 may also, or alternatively, include auto keystone correction capabilities. The AF 124 may detect or analyze information from a screen 125, which is a target surface upon which DLP projector 122 may project video/image 123, and the information regarding screen 125 that is detected or analyzed by AF 124 may be used to focus DLP projector 122 such that video/image 123 is projected upon screen 125 clearly and in focus and may also, or alternatively, be used for keystoning of the DLP projector 122 such that video/image 123 is projected upon screen 125 as a rectangle. The speaker 132 may play sound or music 133, such as sound that corresponds to the recorded image of a remote videoconference participant or music from an audio player 168 or an audio device 141.

The AUX input 140 may connect to external audio devices 141, such as headphones, speakers, or an audio source (e.g., personal device), to receive audio to be played by the speaker 132, such as the sound/music 133, or to transmit audio, such as voice capture 131 recorded by the microphones 130 or audio received through the Wi-Fi component. The HDMI input 142 may connect to an external device, such as a personal computer (PC) 143 or other personal device (e.g., phone or tablet), to receive images to be projected by the DLP projector 122, such as the video/image 123, and/or receive audio to be played by the speaker 132, such as the sound/music 133. The USB input 142 may connect to an external device, such as USB sticker/USB connector 145; to receive images to be projected by the DLP projector 122, such as the video/image 123; to receive audio to be played by the speaker 132, such as the sound/music 133; to transmit images recorded by the camera 120, such as the portrait/scene 121; and/or to transmit audio recorded by the microphones 130, such as the voice capture 131.

The DC input 146 may connect to a power supply 147 to receive and provide power for the apparatus 102. Also, battery 148 may provide power for the apparatus 102. Battery 148, for example, may be a replaceable or rechargeable battery.

The Wi-Fi component 160 may connect the apparatus 102 to the Internet 161, such that the apparatus 102 can receive images to be projected by the DLP projector 122, such as the video/image 123; can receive audio to be played by the speaker 132, such as the sound/music 133; can transmit images recorded by the camera 120, such as the portrait/scene 121; and/or can transmit audio recorded by the microphones 130, such as the voice capture 131. The Wi-Fi component 160 may also connect the apparatus 102 to a universal casting application 162, or a screen mirroring application, such that the apparatus 102 can receive images to be projected by the DLP projector 122, such as the video/image 123 and/or can receive audio to be played by the speaker 132, such as the sound/music 133.

The Bluetooth component 166 may connect a remote control 167 to the apparatus 102, such that the external remote control 167 may be used to control the apparatus 102. For example, the external remote control 167 may control the mode of operation of the apparatus 102 and its internal components, such as the source for the video/image 123 and/or the sound/music 133, the destination for the portrait/scene 121 and/or the voice capture 131, the settings for the camera 120, DLP projector 122, microphones 130, and/or speaker 133, and the connections to the apparatus 102 (e.g., via the Wi-Fi component 160 and/or the Bluetooth component 166).

The fan 170 may cool the inside of the portable body 104 and particularly areas and/or internal components that are heat-producing or heat-sensitive. For example, the fan 170 draws heat away from the DLP projector 122 and maintains a suitable temperature level for the camera 120 and battery 148 to operate. The fan 170 may cool the inside of the portable body 104, or particular areas thereof, by drawing external air into the body 104 through one or more air inlets and expelling hot air out of the body 104, for example, through a heat sink.

FIG. 7 shows a system diagram of an exemplary video communications apparatus 202 in use in an exemplary environment 200. The environment 200 includes a screen 225, a first person 280, who is a user of the apparatus 202, and the apparatus 202, which is positioned between the first person 280 and the screen 225.

The apparatus 202 includes a camera 220 and a projector 222. The camera 220, particularly the lens thereof, is positioned on a first side 210 of the apparatus 202, and the camera 220 is directed outward from the first side 210 toward the first person 280. The projector 222, particularly the lens thereof, is positioned on a second side 212 of the apparatus 202, which is substantially opposite of the first side 210, and the projector 222 is directed outward from the second side 212 toward the screen 225. The apparatus 202 also includes a microphone 230 and a speaker 232.

The camera 220 of the apparatus 202 records an image of the first person 280, who is positioned within the field of view of the camera 220, and the projector of the apparatus 202 projects an image 282 of a second person 284 onto the screen 225. The apparatus 202 is properly positioned such that the camera 220 and projector 222 can record and project, respectively, those images. The apparatus 202 is also properly positioned such that the microphone 230 can record audio of the first person 280, such as voice recordings. The apparatus 202 is also properly positioned such that the speaker 232 can play audio, such as voice recordings of the second person 284, that is audible to the first person 280.

The apparatus 202 is connected via a Wi-Fi connection 260 to an Internet router 261. In real time, the projected image 282 of the second person 284 and corresponding audio of the second person 284 may be received by the apparatus 202 through the Internet, via the Wi-Fi connection 260, and may be projected onto the screen 225 and played by the speaker 232, respectively. Additionally, in real time, an image of the first person 280 and corresponding audio of the first person 280 may be recorded by the camera 220 and microphone 230, respectively, and may be transmitted by the apparatus 202 through the Internet, via the Wi-Fi connection 260, for example, to the second person 284 for viewing and listening.

The apparatus 202 is connected via a Bluetooth connection 266 to a remote control 267. As described herein, the remote control 267 may be used, for example, by the first person 280, to control the apparatus 202. For example, the remote control 267 may control the mode, operation, settings, connections, inputs, or outputs for the apparatus 202 or any component(s) thereof.

The foregoing description, for purposes of illustration and explanation, used specific nomenclature to provide a thorough understanding of the invention. However, it will be apparent to one skilled in the art that specific details are not required in order to practice the invention. Thus, the foregoing descriptions of specific embodiments of the invention are not intended to be exhaustive or to limit the invention to the precise forms disclosed; obviously, many modifications and variations are possible in view of the above teachings. The embodiments were chosen and described in order to best explain the principles of the invention and its practical applications, and they thereby enable others skilled in the art to best utilize the invention and various embodiments with various modifications as are suited to the particular use contemplated.

The invention claimed is:

1. A video communications apparatus comprising:
a body;
a projector housed in the body;
a heat dissipation system housed in the body, wherein the heat dissipation system is proximate to the projector and comprises a fan and a heat sink;
a camera housed in the body;
a speaker housed in the body; and
a microphone housed in the body,
wherein the projector and the camera are operable when housed in the body, wherein the height of the body is less than 18 cm and the largest width of the body is less than 9 cm.

2. The video communications apparatus of claim 1, wherein the camera comprises electronic pan and tilt capabilities.

3. The video communications apparatus of claim 1, wherein the camera comprises electronic zoom capability.

4. The video communications apparatus of claim 1, further comprising a noise cancellation feature capable of canceling a first sound played by the speaker from a second sound captured by the microphone.

5. The video communications apparatus of claim 1, further comprising a CPU coupled to the projector, the camera, the speaker, and the microphone.

6. The video communications apparatus of claim 5, further comprising a videoconferencing application capable of hosting a videoconferencing session, wherein the videoconferencing application runs on the CPU and the videoconferencing session accesses the projector, the camera, the speaker, and the microphone.

7. The video communications apparatus of claim 1, further comprising one or more wireless connectivity components.

8. The video communications apparatus of claim 7, wherein the one or more wireless connectivity components comprises a Bluetooth connectivity component or a Wi-Fi connectivity component.

9. The video communications apparatus of claim 7, wherein the one or more wireless connectivity components is configured for screen casting or screen mirroring from a separate wireless device to the projector.

10. The video communications apparatus of claim 1, further comprising an autofocus component coupled to the projector.

11. The video communications apparatus of claim 1, further comprising an auto keystone correction component coupled to the projector.

12. The video communications apparatus of claim 1, further comprising a plurality of switches on the body.

13. The video communications apparatus of claim 12, wherein the plurality of switches comprises a power switch, at least one volume switch, at least one navigation switch, and at least one mode switch.

14. The video communications apparatus of claim 1, wherein the projector is a Digital Light Processing (DLP) projector.

15. A video communications apparatus comprising:
a body;
a projector housed in the body;
a heat dissipation system housed in the body, wherein the heat dissipation system is proximate to the projector and comprises a fan and a heat sink;
a camera housed in the body;
a speaker housed in the body; and
a microphone housed in the body,
wherein the projector and the camera are operable when housed in the body, wherein the body comprises a first side and a second side opposite the first side, wherein the camera is positioned on the first side and is directed outward from the first side of the body and the projector is positioned on the second side and is directed outward from the second side of the body.

16. The video communications apparatus of claim 15, further comprising a noise cancellation feature capable of canceling a first sound played by the speaker from a second sound captured by the microphone.

17. The video communications apparatus of claim 15, further comprising a CPU coupled to the projector, the camera, the speaker, and the microphone and a videoconferencing application capable of hosting a videoconferencing session, wherein the videoconferencing application runs on the CPU and the videoconferencing session accesses the projector, the camera, the speaker, and the microphone.

18. The video communications apparatus of claim 15, further comprising a wireless connectivity component configured for screen casting or screen mirroring from a separate wireless device to the projector.

19. The video communications apparatus of claim 15, further comprising an auto keystone correction component coupled to the projector.

20. A video communications apparatus comprising:
a body;
a projector housed in the body;
a heat dissipation system housed in the body, wherein the heat dissipation system is proximate to the projector and comprises a fan and a heat sink;
a camera housed in the body;
a speaker housed in the body; and
a microphone housed in the body,
wherein the projector and the camera are operable when housed in the body, wherein the heat dissipation system creates an air flow comprising a first flow into the body, a second flow through the fan, and a third flow out of the body through the heat sink, wherein the first, second, and third flows are sequential.

21. The video communications apparatus of claim 20, further comprising a noise cancellation feature capable of canceling a first sound played by the speaker from a second sound captured by the microphone.

22. The video communications apparatus of claim 20, further comprising a CPU coupled to the projector, the camera, the speaker, and the microphone and a videoconferencing application capable of hosting a videoconferencing session, wherein the videoconferencing application runs on the CPU and the videoconferencing session accesses the projector, the camera, the speaker, and the microphone.

23. The video communications apparatus of claim 20, further comprising a wireless connectivity component configured for screen casting or screen mirroring from a separate wireless device to the projector.

24. The video communications apparatus of claim 20, further comprising an auto keystone correction component coupled to the projector.

25. A videoconferencing method comprising:
providing a videoconferencing apparatus comprising:
a body;
a projector housed in the body;
a heat dissipation system housed in the body, wherein the heat dissipation system is proximate to the projector and comprises a fan and a heat sink;
a camera housed in the body;
a speaker housed in the body; and
a microphone housed in the body,
wherein the projector, the camera, the speaker, and the microphone are operable when housed in the body;
capturing a first image of a first subject using the camera;
capturing a first sound from the first subject using the microphone;
projecting a second image of a second subject onto a surface using the projector;
playing a second sound from the second subject using the speaker; and
cooling the projector with the heat dissipation system.

26. The videoconferencing method of claim 25, wherein the videoconferencing apparatus further comprises a CPU housed in the body and coupled to the projector, the camera, the speaker, and the microphone, and the videoconferencing method further comprises running a videoconferencing application on the CPU.

27. The videoconferencing method of claim 25, wherein the videoconferencing apparatus further comprises a Bluetooth connectivity component, and the videoconferencing method further comprises transmitting the first image of the first subject via Bluetooth to a separate wireless device paired to the Bluetooth connectivity component.

28. The videoconferencing method of claim 25, wherein the videoconferencing apparatus further comprises a Wi-Fi connectivity component, and the videoconferencing method further comprises transmitting the first image of the first subject and the first sound from the first subject via Wi-Fi through a router to which the Wi-Fi connectivity component is connected.

29. The videoconferencing method of claim 25, wherein the videoconferencing apparatus further comprises a Wi-Fi connectivity component, and the videoconferencing method further comprises receiving the second image of the second subject and the second sound from the second subject via Wi-Fi through the Wi-Fi connectivity component.

30. The videoconferencing method of claim 25, wherein the videoconferencing apparatus further comprises a wireless connectivity component configured for screen casting or screen mirroring, and the videoconferencing method further comprises receiving the second image of the second subject via screen casting or screen mirroring through the wireless connectivity component.

31. The videoconferencing method of claim 25, wherein the videoconferencing apparatus further comprises an autofocus component coupled to the projector, and the videoconferencing method comprises using the autofocus component to automatically focus the projector to project the second image clearly onto the surface.

32. The videoconferencing method of claim 25, wherein cooling the projector comprises creating an air flow with the heat dissipation system, wherein the air flow comprises a first flow into the body, a second flow through the fan, and a third flow out of the body through the heat sink, wherein the first, second, and third flows are sequential.

33. The videoconferencing method of claim 25, wherein cooling the projector comprises creating an air flow with the heat dissipation system, wherein the air flow comprises a hot gas flow of hot gas from the projector to the fan and a circular air flow within the fan.

34. A video communications apparatus comprising:
a body;
a projector housed in the body;
a heat dissipation system housed in the body, wherein the heat dissipation system is proximate to the projector and comprises a fan and a heat sink;
a camera housed in the body;
a speaker housed in the body; and
a microphone housed in the body,
wherein the projector and the camera are operable when housed in the body, wherein the heat dissipation system creates an air flow comprising a hot gas flow of hot gas from the projector to the fan and a circular air flow within the fan.

35. The video communications apparatus of claim 34, further comprising a noise cancellation feature capable of canceling a first sound played by the speaker from a second sound captured by the microphone.

36. The video communications apparatus of claim 34, further comprising a CPU coupled to the projector, the camera, the speaker, and the microphone and a videoconferencing application capable of hosting a videoconferencing session, wherein the videoconferencing application runs on the CPU and the videoconferencing session accesses the projector, the camera, the speaker, and the microphone.

37. The video communications apparatus of claim 34, further comprising a wireless connectivity component configured for screen casting or screen mirroring from a separate wireless device to the projector.

38. The video communications apparatus of claim 34, further comprising an auto keystone correction component coupled to the projector.

* * * * *